(12) United States Patent
Zalkovskij et al.

(10) Patent No.: US 12,730,248 B2
(45) Date of Patent: Sep. 8, 2026

(54) OPTICAL ELEMENTS THAT INCLUDE A METASURFACE

(71) Applicant: NILT Switzerland GmbH, Horgen (CH)

(72) Inventors: Maksim Zalkovskij, Copenhagen (DK); Mark Allen Moxey, Hillerød (DK)

(73) Assignee: NILT Switzerland GmbH, Horgen (CH)

( * ) Notice: Subject to any disclaimer, the term of this patent is extended or adjusted under 35 U.S.C. 154(b) by 411 days.

(21) Appl. No.: 18/247,592

(22) PCT Filed: Oct. 7, 2021

(86) PCT No.: PCT/EP2021/077651
§ 371 (c)(1),
(2) Date: Mar. 31, 2023

(87) PCT Pub. No.: WO2022/074100
PCT Pub. Date: Apr. 14, 2022

(65) Prior Publication Data

US 2023/0375748 A1 Nov. 23, 2023

Related U.S. Application Data

(60) Provisional application No. 63/089,991, filed on Oct. 9, 2020.

(51) Int. Cl.
*G02B 1/00* (2006.01)

(52) U.S. Cl.
CPC .................................... *G02B 1/002* (2013.01)

(58) Field of Classification Search
CPC ........ G02B 5/008; G02B 1/002; G02B 1/007; G02B 26/06; G02B 1/005; G02B 5/1809; G02F 1/292; G02F 2202/30
See application file for complete search history.

(56) References Cited

U.S. PATENT DOCUMENTS

| | | | |
|---|---|---|---|
| 10,365,535 | B2 | 7/2019 | Ahmed et al. |
| 10,705,190 | B2 | 7/2020 | Jang et al. |

(Continued)

FOREIGN PATENT DOCUMENTS

| | | |
|---|---|---|
| EP | 3252509 | 12/2017 |
| JP | 2009-534700 A | 9/2009 |

(Continued)

OTHER PUBLICATIONS

Hong, the English translation document for KR-20180103662-A (Year: 2018).*

(Continued)

*Primary Examiner* — Jonathan Y Jung
(74) *Attorney, Agent, or Firm* — Fish & Richardson P.C.

(57) ABSTRACT

An apparatus includes an optical element that has an optical metasurface including meta-atoms. In some instances, at least some of the meta-atoms have a first height and others of the meta-atoms have a second height that differs from the first height. In some instances, each meta-atom has a cross-section composed of a first metamaterial surrounded laterally by a second different metamaterial. Techniques for manufacturing such optical elements also are disclosed.

17 Claims, 5 Drawing Sheets

(56) References Cited

U.S. PATENT DOCUMENTS

| | | | | |
|---|---|---|---|---|
| 2013/0342898 | A1 | 12/2013 | Alvine et al. | |
| 2016/0071990 | A1* | 3/2016 | Smith | H10F 77/707 438/93 |
| 2017/0082263 | A1* | 3/2017 | Byrnes | B82Y 20/00 |
| 2017/0351111 | A1 | 12/2017 | Jeong et al. | |
| 2019/0033683 | A1 | 1/2019 | Ahmed et al. | |
| 2019/0064532 | A1* | 2/2019 | Riley, Jr. | G02B 27/0916 |
| 2019/0086579 | A1 | 3/2019 | Kim et al. | |
| 2019/0113727 | A1 | 4/2019 | Tamma | |
| 2020/0166783 | A1 | 5/2020 | Roy et al. | |
| 2020/0249429 | A1 | 8/2020 | Han et al. | |
| 2020/0264343 | A1* | 8/2020 | Han | G02B 1/002 |
| 2020/0326621 | A1 | 10/2020 | Godet et al. | |

FOREIGN PATENT DOCUMENTS

| | | | | |
|---|---|---|---|---|
| JP | 2018-193429 A | | 12/2018 | |
| JP | 2020-522009 A | | 7/2020 | |
| KR | 20140026814 A | * | 3/2014 | B82B 3/0038 |
| KR | 20180103662 A | * | 9/2018 | H01Q 15/0086 |

OTHER PUBLICATIONS

International Preliminary Report on Patentability in International Appln. No. PCT/EP2021/077651, dated Mar. 28, 2023, 12 pages.
International Search Report and Written Opinion in International Appln. No. PCT/EP2021/077651, dated Jan. 21, 2022, 16 pages.
Choe et al., "Rational and Facile Construction of 3D Annular Nanostructures with Tunable Layers by Exploiting the Diffraction and Interference of Light," Advanced Functional Materials, Jun. 9, 2016, 26(29):5203-5210.
Communication pursuant to Article 94(3) EPC in European Appln. No. 21790814.4, mailed on Jun. 20, 2025, 9 pages.
Shrestha et al., "Broadband achromatic dielectric metalenses," Light: Science & Applications, Nov. 7, 2019, 7(85), 11 pages.
Office Action in Chinese Appln. No. 202180067881.7, mailed on Sep. 5, 2025, 10 pages (with English translation).
Office Action in Japanese Appln. No. 2023-546384, mailed on Oct. 28, 2025, 12 pages (with English translation).

* cited by examiner 252A
252BA
50B
252D
252C 252B
252A
24
30A
30A
252A
252
252D
252C
50B 252B
252A
24

24
252B
252A
30A
30A
252

OPTICAL ELEMENTS THAT INCLUDE A METASURFACE

CROSS-REFERENCE TO RELATED APPLICATIONS

This application is a National Stage application under 35 U.S.C. § 371 of International Application No. PCT/EP2021/077651, filed on Oct. 7, 2021, which claims priority and benefit from U.S. Provisional Patent Application No. 63/089,991, filed on Oct. 9, 2020, the contents and disclosures of which are incorporated herein by reference in their entirety.

FIELD OF THE DISCLOSURE

The present disclosure relates to optical elements that include a metasurface.

BACKGROUND

Advanced optical elements may include a metasurface, which refers to a surface with distributed small structures (e.g., meta-atoms) arranged to interact with light in a particular manner. For example, a metasurface, which also may be referred to as a metastructure, can be a surface with a distributed array of nanostructures. The nanostructures may, individually or collectively, interact with light waves. For example, the nanostructures or other meta-atoms may change a local amplitude, a local phase, or both, of an incoming light wave.

When meta-atoms (e.g., nanostructures) of a metasurface are in a particular arrangement, the metasurface may act as an optical element such as a lens, lens array, beam splitter, diffuser, polarizer, bandpass filter, or other optical element. In some instances, metasurfaces may perform optical functions that are traditionally performed by refractive and/or diffractive optical elements.

SUMMARY

The present disclosure describes optical elements that include a metasurface, as well as methods for manufacturing the optical elements.

For example, in one aspect, the disclosure describes an apparatus that includes an optical element. The optical element has an optical metasurface that includes meta-atoms. At least some of the meta-atoms have a first height and others of the meta-atoms have a second height that differs from the first height.

Some implementations include one or more of the following features. For example, some of the meta-atoms may have a third height that differs from the first height and from the second height. In some implementations, each of the meta-atoms comprises a metamaterial laterally surrounding a polymeric material. In some cases, each of the meta-atoms has an annular cross-section. In some implementations, each of the meta-atoms has a solid cross-section composed of a metamaterial. In some instances, each of the meta-atoms has a solid cross-section composed of a first metamaterial surrounded laterally by a second different metamaterial. In some cases, each of the meta-atoms has an annular cross-section composed of a first metamaterial surrounded laterally by a second different metamaterial. In some implementations, the apparatus includes a substrate, and a polymeric layer on which the meta-atoms are disposed, wherein the polymeric layer is disposed between each of the meta-atoms and the substrate. In some instances, the meta-atoms are composed of at least one metamaterial having a high index of refraction and a low optical loss.

The disclosure also describes optical elements in which the meta-atoms do not necessarily have different heights (e.g., all the meta-atoms may have the same height as one another). For example, an apparatus can include an optical element that has an optical metasurface including meta-atoms, wherein each meta-atom has a cross-section composed of a first metamaterial surrounded laterally by a second different metamaterial. In some implementations, each of the meta-atoms has an annular cross-section.

The disclosure also describes a method of manufacturing an optical element. The method includes imprinting a polymeric layer that is disposed on a substrate. The imprinting results in formation of projections, extending away from the substrate, of material of the polymeric layer. The method also includes forming meta-atoms composed at least in part of a first metamaterial. Forming the meta-atoms includes depositing the first metamaterial layer over the projections. The method also can include removing a portion of the first metamaterial layer to expose a surface of the projections of the material of the polymeric layer.

Some implementations include one or more of the following features. For example, some of the meta-atoms have a first meta-atom height and other ones of the meta-atoms have a second meta-atom height that differs from the first meta-atom height. The method may further include removing a residual portion of the polymeric layer present on the substrate such that each of the meta-atoms has an annular cross-section. In some implementations, the method includes removing a residual portion of the polymeric layer present on the substrate, and depositing a second metamaterial layer in areas where the residual portion of the polymeric layer was removed, such that each of the meta-atoms has a solid cross-section. In some instances, the second metamaterial layer is composed of a same material as a material of the first metamaterial layer. Further, in some cases, the second metamaterial layer is composed of a material that is different from a material of the first metamaterial layer. In some implementations, each of the meta-atoms has a solid cross-section that includes an annular portion composed of the first metamaterial surrounded laterally by a core portion composed of the second metamaterial. In some instances, forming the meta-atoms further includes depositing a second metamaterial layer over the projections, wherein the second metamaterial is different from the first metamaterial, and wherein each of the meta-atoms includes a first annular ring composed of the first metamaterial and a second annular ring composed of the second metamaterial.

The foregoing techniques can, in some instances, provide greater optical design freedom that can lead, for example, to optical elements having improved optical efficiency.

Other aspects, features and advantages will be readily apparent from the following detailed description, the accompanying drawings, and the claims.

DETAILED DESCRIPTION

The present disclosure describes optical elements (e.g., a metalens) that include meta-atoms of different heights. The disclosure also describes techniques for manufacturing such optical elements.

Figure 1:
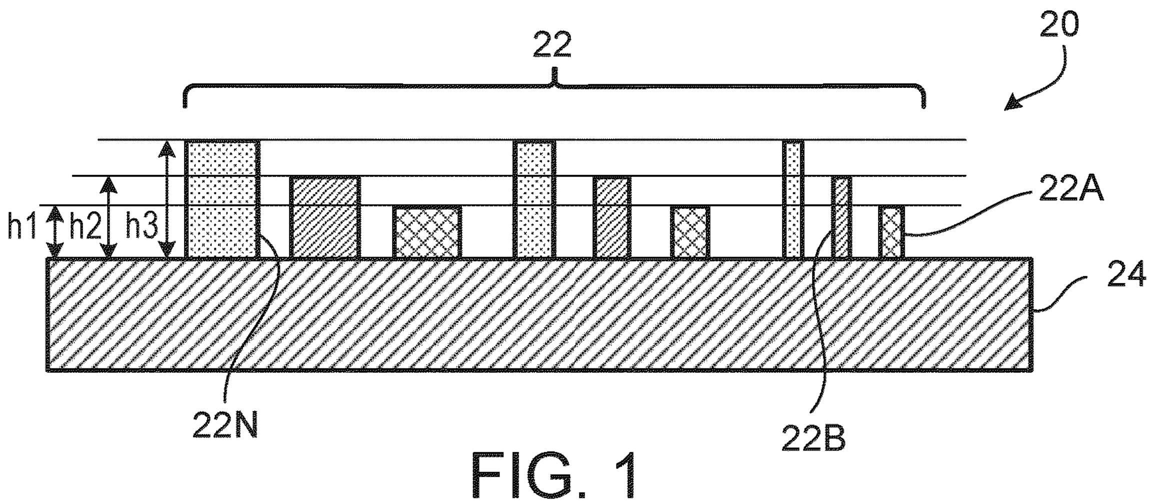
FIG. 1 shows an example of an optical element that includes a metasurface including meta-atoms that have different heights.

As illustrated in the example of FIG. 1, an optical element (e.g., a metalens) 20 includes multiple meta-atoms 22A, 22B, . . . 22N (collectively 22) in an optically active area of the optical element. The meta-atoms 22 can be formed, for example, on a substrate 24, which, in some instances, may be selected to be optically transmissive with respect to a particular wavelength or range of wavelengths of radiation (e.g., infra-red (IR) or visible light) depending on the application(s) in which the metastructure is to be used. For example, in some instances, the substrate 24 may be composed of glass. Different materials may be suitable for other implementations.

In general, it is desirable that the material for the meta-atoms 22 (i.e., the metamaterial) have a relatively high index of refraction and relatively low optical loss. In general, the refractive index should be greater than 1. For example, materials having a refractive index in the range of 1 to Scan be used. Further, the optical loss (k) preferably should be less than 0.1, and in some instances, may be many orders of magnitude smaller. Suitable metamaterials may include oxides (e.g., $Al_2O_3$, $TiO_2$, $HfO_2$, $SiO_2$, $Ta_2O_5$, ZnO), nitrides (e.g., AlN, TiN, HfN, TaN), fluorides (e.g., $AlF_3$, $MgF_2$), sulfides (e.g., ZnS, $MoS_2$), and/or metals (e.g., Pt, Ni, Ru). Other suitable materials may include titanium dioxide ($TiO_2$), zirconium oxide ($ZnO_2$), tin oxide ($SnO_2$), indium oxide ($In_2O_3$), and/or tin nitride (TiN).

The height of each meta-atom 22 may differ from the height of one or more of the other meta-atoms. Thus, in the example of FIG. 1, the meta-atom 22A has a height of h1, the meta-atom 22B has a height h2, and the meta-atom 22N has a height h3, where $h1<h2<h3$. In some implementations, the meta-atoms 22 having different heights with respect to each other can provide greater optical design freedom that can lead, for example, to better optical efficiency.

Although the meta-atoms 22 in FIG. 1 collectively have three different heights, in some implementations, the meta-atoms collectively may have only two different heights, and in some implementations, they have more than three different heights.

The specific values for the dimensions of the meta-atoms 22 (e.g., their heights, the number of different heights, the aspect ratio of the meta-atoms, the diameter of the meta-atoms, and the distance between adjacent meta-atoms) may depend on the particular application. In a particular example, the meta-atoms 22 have an aspect ratio about 1:8, diameters in the range of 5 nm-200 nm, heights in the range of 800 nm±500 nm, and a distance between adjacent meta-atoms of about 40 nm. Different values may be used for other implementations.

In the example of FIG. 1, the meta-atoms 22 are shown as being in direct contact with the substrate 24. In other implementations, the meta-atoms 22 may be formed, for example, on a thin polymeric or other layer disposed on the substrate 24. Examples of such a polymeric layer include a nanoimprint lithography (ML) resist. Other polymeric materials may be suitable for some implementations. In some instances, an adhesion layer may be included to increase adhesion between the meta-atoms 22 and the substrate 24. The adhesion layer may be composed, for example, of a polymeric material.

The following paragraphs describe examples of techniques that can be used to produce an optical element that includes a metastructure comprising meta-atoms having different heights, such as the example of FIG. 1. As explained below, the techniques can use imprinting, which allows a metastructure to be transferred, for example, to an ultraviolet (UV)-curable resin, which can facilitate the large-scale manufacture of optical elements having metastructures.

Figure 2:
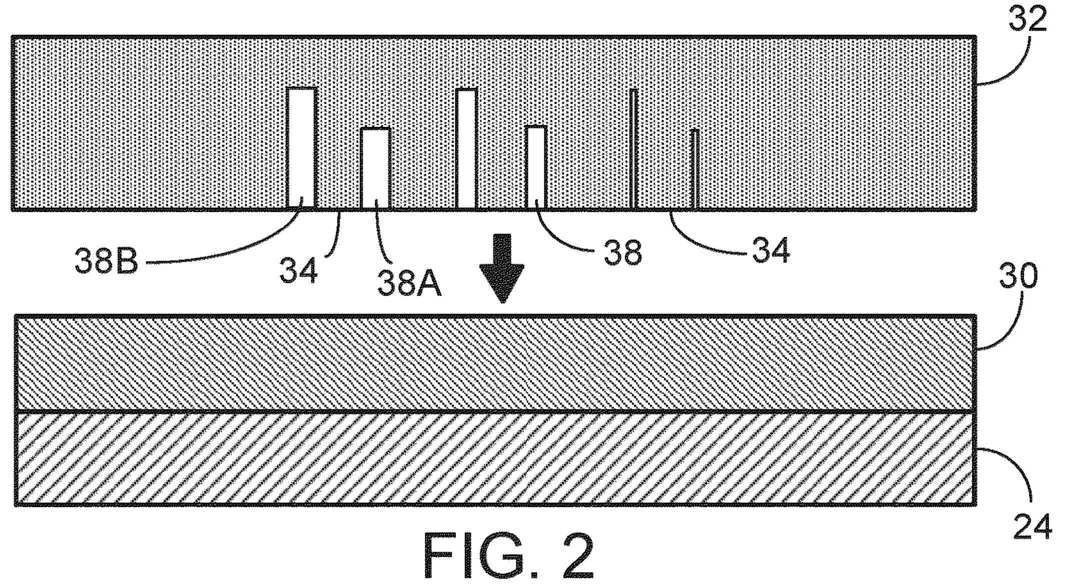
FIG. 2 illustrates an imprinting technique that is part of a process of forming meta-atoms.

For example, as shown in FIG. 2, a substrate 24 having a polymeric layer (e.g., NIL resist) 30 on its surface can be provided, and the polymeric layer can be imprinted using an imprint stamp (which also may be referred to as an imprint mask or mold) 32 having a structured arrangement of features 34 that project toward the substrate. Spaces 38 between the projections 34 of the stamp 32 have respective depths that differ from one another. In particular, the depths of the spaces 38 correspond to the different heights of the desired arrangement of meta-atoms to be formed on the substrate 24. In the example of FIG. 2, some of the spaces (e.g., 38A) have a depth d1, whereas other ones of the spaces (e.g., 38B) have a different depth d2). As part of the imprinting technique, the stamp 32 is brought into contact with the polymeric layer 30 and is pressed towards the substrate 24. In some implementations, the imprinting process involves embossing or replication. Prior to separating the stamp 32 from the polymeric layer 30, the polymeric layer can be cured (for example, using an ultraviolet (UV) flash cure and/or a thermal cure).

Figure 3:
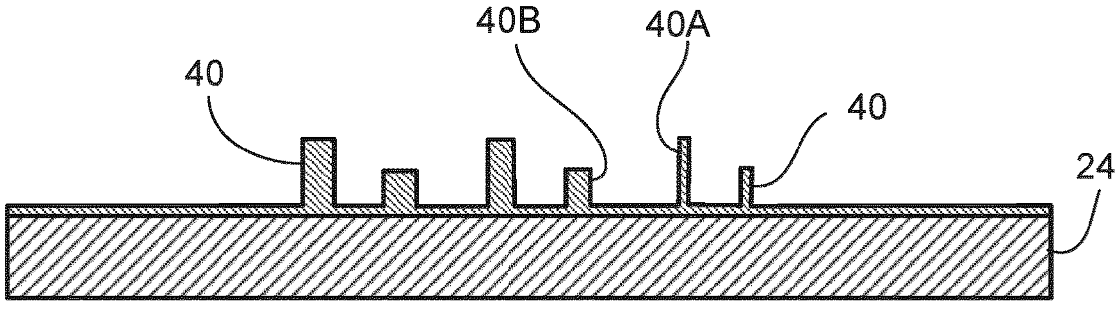
FIG. 3 shows an example result of the imprinting technique of FIG. 2.

As shown in FIG. 3, the imprinting imparts an inverse image of the stamp's features into the polymeric layer 30. Thus, following the imprinting, portions 40 of the polymeric layer 30 that project away from the substrate 24 correspond to the positions of the stamp's spaces 38. Further, the respective height of each of the portions 40 is substantially the same as the depth of the corresponding space 38 in the stamp 32. Thus, some of the portions of the polymeric layer (e.g., 40A) have a height H1 that is equal to, or approximately equal to, the depth d1 of the space 38A. Likewise, some of the portions of the polymeric layer (e.g., 40B) have a different height H2 that is equal to, or approximately equal to, the depth d2 of the space 38B. Although the illustrated example of FIGS. 2 and 3 shows that the stamp 30 has spaces 38 of two different depths, and that the corresponding pattern in the polymeric layer has projections 40 that have two different heights, in some implementations there may be more than two different depths for the stamp's spaces 38 and, correspondingly, more than two different heights for the projections 40 of the polymeric layer.

In some implementations, it may be desirable to perform etching to remove some or all of the residual polymeric layer 30A on the surface of the substrate 24. For example, in some instances, an anisotropic etch (e.g., $O_2$ plasma with a bias applied) in which material removal is directionally dependent, can be performed to remove at least some of the residual polymeric layer 30A. Retaining a residual polymeric layer may be advantageous in some cases so as to provide a more mechanically robust structure. However, the thickness of the remaining residual polymeric layer should be less than the operating wavelength for the resulting optical element. For example, in a particular instance, the operating wavelength is 940 nm, and the residual layer has a thickness in the range of 5 nm to 50 nm. In some instances, it is desirable to remove the residual polymeric layer 30A entirely. Complete removal of the residual polymeric layer 30A can be advantageous, for example, where the active medium material deposited in the subsequent step(s) makes direct contact with the substrate and is less prone to mechanical damage or degradation (e.g., delamination).

In some implementations, an isotropic etch (e.g., $O_2$ plasma without an applied bias), in which material removal is not directionally dependent, can be used to remove some or all of the residual polymeric layer 30A as well as to reduce the diameter of the projecting portions 40 of the polymeric layer. Such etching can be advantageous, for example, to achieve a diameter for the projecting portions 40 that is smaller than the imprinted diameter.

Figure 4:
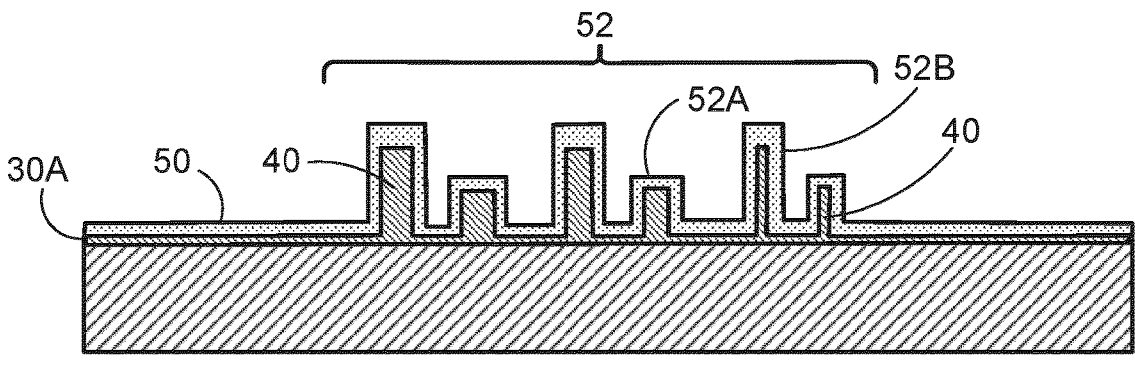
FIG. 4 shows an example result of depositing a metamaterial layer.

As shown in FIG. 4, an optically active medium layer 50 for the meta-atoms then is deposited over the side of the substrate 24 on which the polymeric projections 40 are present. The active medium 50 may be referred to as a metamaterial and is composed of sub-wavelength components, or meta-atoms that individually alter a property (e.g., intensity, phase and/or polarization) of light passing through the material. The active medium 50 can be deposited, for example, by atomic layer deposition (ALD), sputtering or chemical vapor deposition (CVD). The deposition technique can be isotropic. Suitable materials for the active medium layer 50 may include oxides, nitrides, fluorides, sulfides, and/or metals, such as those discussed above in connection with the meta-atoms 22 of FIG. 1. The thickness of the active medium layer 50 can vary depending on the application. In some implementations, however, the active medium layer 50 has a thickness in the range of 20-200 nm. For relatively thin thicknesses of the active medium 50, where the residual polymeric layer 30A can be included in the metalens design, the structure shown in FIG. 4 may serve as an optical element that can be incorporated into an optical device (e.g., a light emitting or light sensing device). As is evident from FIG. 4, the resulting structure includes meta-atoms 52 having two or more different heights. For example, some of the meta-atoms (e.g., 52A) have a first height, whereas some of the meta-atoms (e.g., 52B) have a different second height.

Figure 5A:
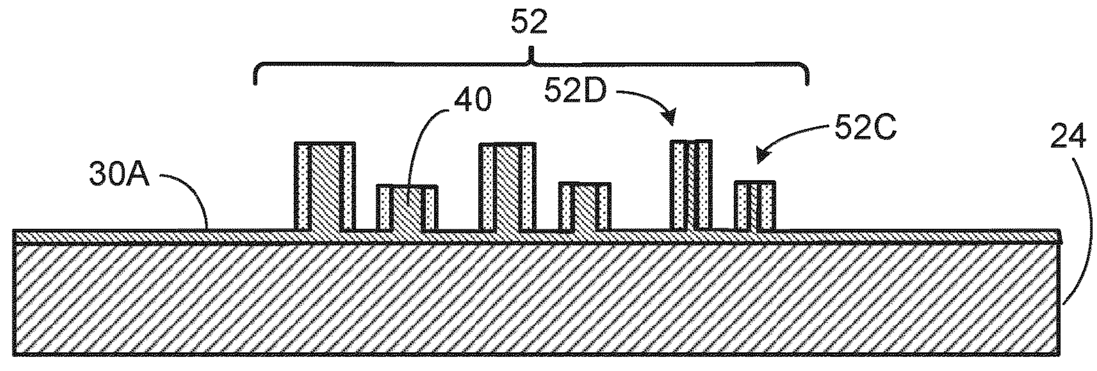
FIG. 5A shows another example of a metasurface formed in accordance with some implementations.
Figure 5B:
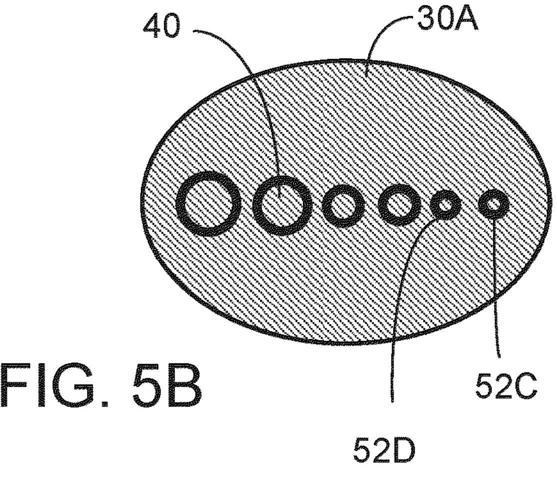
FIG. 5B is a top view of the example of FIG. 5A.

In some implementations, as shown in FIGS. 5A and 5B, it is desirable to etch back the previously deposited active medium layer 50 so as to expose the projecting portions 40 of the polymeric layer. Suitable techniques for removing part of the active medium layer 50 include reactive ion etching (RIE) or chemical etching. Such techniques can etch the active medium layer 50 selectively such that the side surfaces of the projecting portions 40 of the polymeric layer 30 remain covered by the material of the active medium layer 50. The result, as shown in the example of FIG. 5B, is doughnut-shaped meta-atoms 52 having an annular cross-section that laterally surround pillar-shaped projections 40 of polymeric material. Doughnut-shaped meta-atoms can, in some cases, provide improved optical performance (e.g., polarization control and/or higher efficiency). The structure shown in FIGS. 5A and 5B may serve as an optical element that can be incorporated into an optical device (e.g., a light emitting or light sensing device). As is evident from FIG. 5A, the resulting structure includes meta-atoms 52 having two or more different heights. For example, some of the meta-atoms (e.g., 52C) have a first height, whereas some of the meta-atoms (e.g., 52D) have a different second height.

Figure 6A:
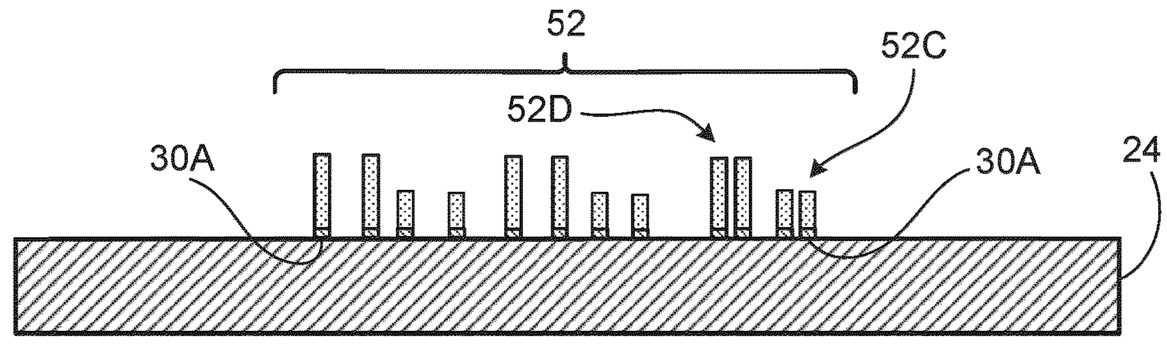
FIG. 6A shows another example of a metasurface formed in accordance with some implementations.
Figure 6B:
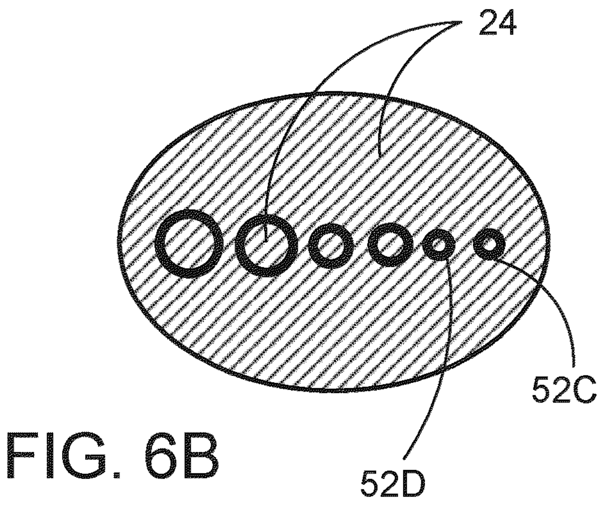
FIG. 6B is a top view of the example of FIG. 6A.

In some implementations, as shown in FIGS. 6A and 6B, it is desirable to remove the residual polymeric layer 30A that remains on the surface of the substrate 24 (other than the this residual polymeric layer that is disposed between the active medium material 50 of the meta-atoms 52 and the substrate). Various types of etching processes may be used for this purpose. For example, a dry etch (e.g., $O_2$ plasma) or a chemical etch (e.g., acetone or another appropriate solvent) may be used. The result, as shown in the example of FIG. 6B, is doughnut-shaped meta-atoms 52 having an annular cross-section. The structure shown in FIGS. 6A and 6B may serve as an optical element that can be incorporated into an optical device (e.g., a light emitting or light sensing device). As is evident from FIG. 6A, the resulting structure includes meta-atoms 52 having two or more different heights. For example, some of the meta-atoms (e.g., 52C) have a first height, whereas some of the meta-atoms (e.g., 52D) have a different second height.

In some implementations, it is desirable for the meta-atoms 52 to have a solid (e.g., circular) cross-section rather than having an annular-shaped cross-section. Such a structure can be achieved, for example, by depositing additional active medium material inside the previously-formed doughnut-shaped meta-atoms. The additional active medium material can be deposited, for example, by ALD, sputtering or CVD, and can be isotropic. Suitable materials for the additional active medium material may include oxides, nitrides, fluorides, sulfides, and/or metals, such as those discussed above in connection with the meta-atoms 22 of FIG. 1.

Figure 7:
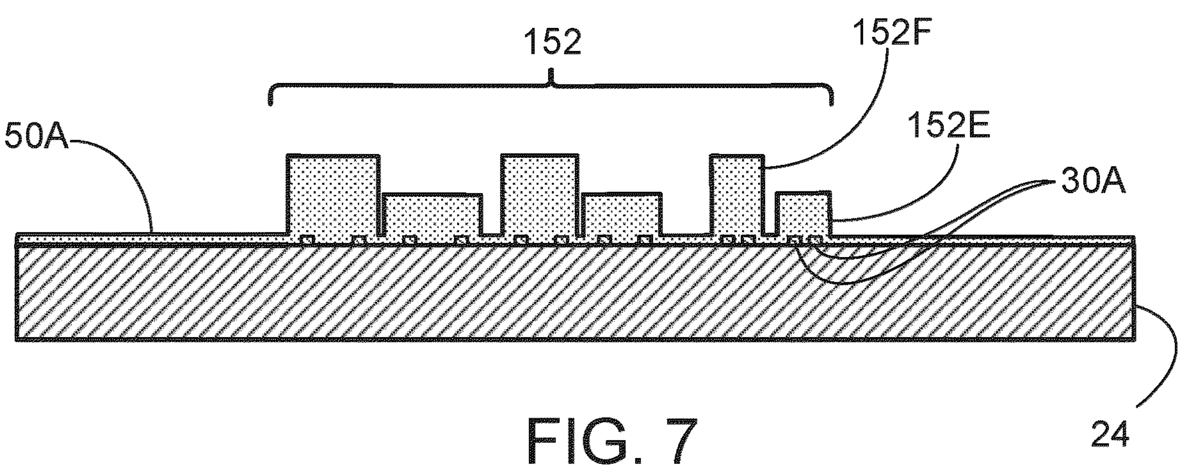
FIG. 7 shows another example of metasurface formed in accordance with some implementations.

An example is shown in FIG. 7, in which the additional active medium material 50A is the same as the previously deposited active medium material 50. In this case, the composition of the resulting meta-atoms 152 is substantially uniform. As is evident from FIG. 7, the resulting structure includes meta-atoms 152 having two or more different heights. For example, some of the meta-atoms (e.g., 152E) have a first height, whereas some of the meta-atoms (e.g., 152F) have a different second height. An advantage of this approach is that in some implementations the meta-atoms can be formed in closer proximity than otherwise would be allowed by NIL techniques.

Figures 8A, 8B, 9A, 9B:
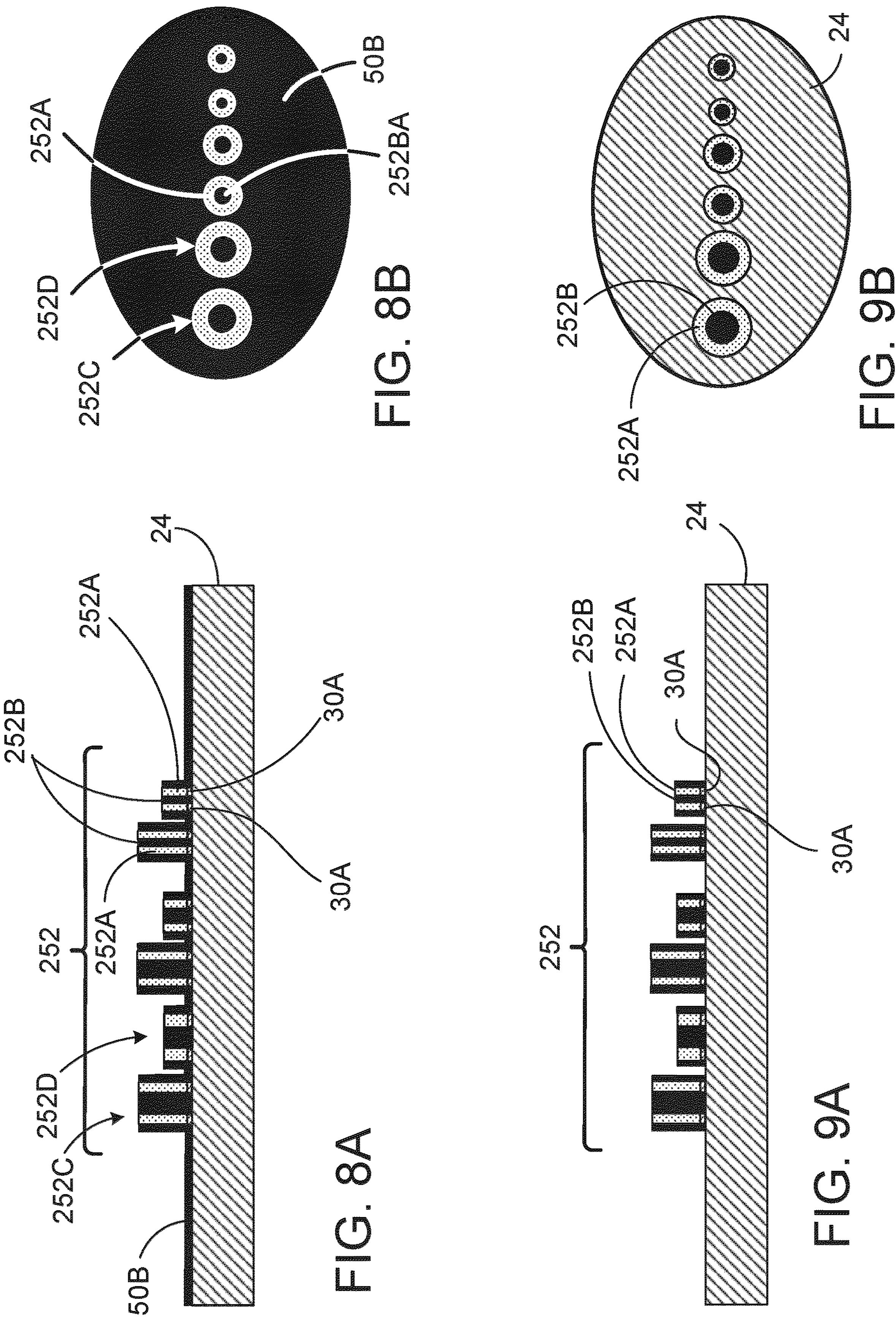
FIG. 8A shows another example of a metasurface formed in accordance with some implementations.
FIG. 8B is a top view of the example of FIG. 8A.
FIG. 9A shows another example of a metasurface formed in accordance with some implementations.
FIG. 9B is a top view of the example of FIG. 9A.

FIGS. 8A and 8B show another example in which the additional active medium material 50B is different from the previously deposited active medium material. In this case, each of the meta-atoms 252 has a solid cross-section that includes a ring 252A composed of a first active medium material laterally surrounding a central core 252B composed of a second active medium material that is different from the first active medium material. These techniques can, thus, be used to produce optical elements (e.g., metalenses) that have metastructures whose optically active areas include meta-atoms composed of multiple different materials. As is evident from FIG. 8A, the resulting structure includes meta-atoms 252 having two or more different heights. For example, some of the meta-atoms (e.g., 252C) have a first height, whereas some of the meta-atoms (e.g., 252D) have a different second height. In some instances, a further etch may be performed to remove some of the additional active medium material 50B so as to expose the surface of the substrate 24 (see FIGS. 9A and 9B).

Figure 10A:
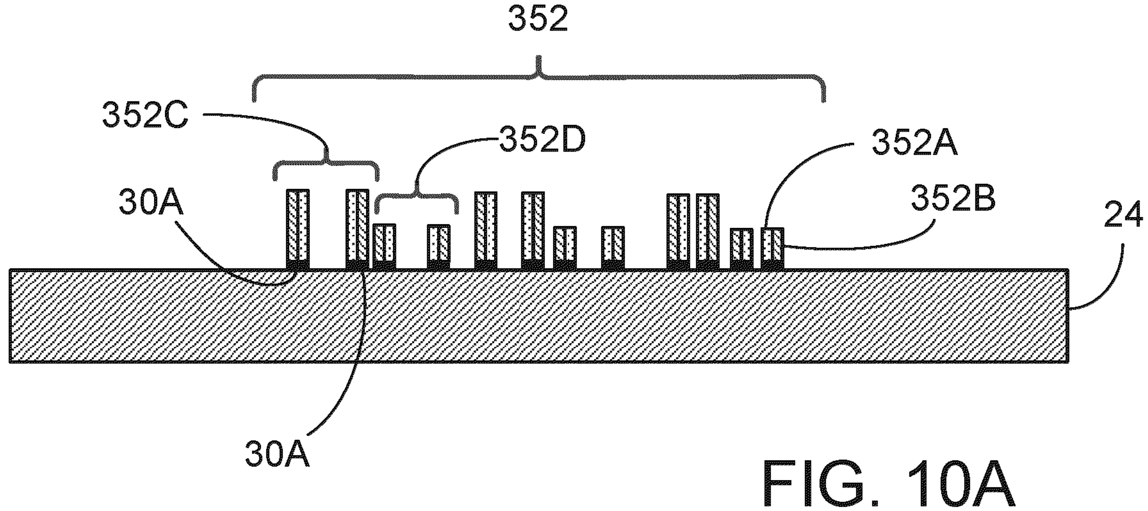
FIG. 10A shows another example of a metasurface formed in accordance with some implementations.
Figure 10B:
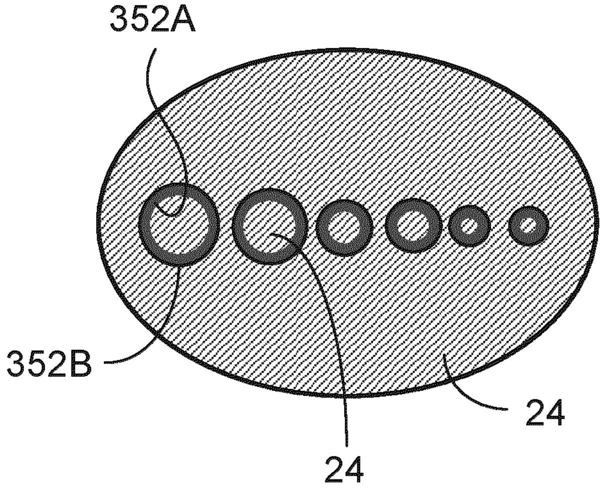
FIG. 10B is a top view of the example of FIG. 10A.

In some implementations, the meta-atoms have an annular shape and can be composed of a first ring of a first active medium material surrounded by a second ring of a second active medium material that is different from the first active medium material. FIGS. 10A and 10B illustrate an example in which each of the meta-atoms 352 has a first ring 352A of a first active medium material surrounded by a second ring 352B of a second active medium material that is different from the first active medium material. One way to obtain such a structure is to deposit a second active medium material after depositing the first active medium material (e.g., after obtaining the structure shown in FIG. 4 or 5A), but before removal of the projecting portions 40 of the polymeric layer 30 that are surrounded by the first active medium material (e.g., before obtaining the structure of FIG. 6A). The material of the second active medium layer can be deposited in the same manner as the first active medium layer (e.g., by ALD, sputtering or CVD). Following deposition of the second active medium layer, the residual polymeric layer that remains on the surface of the substrate 24 (other than the residual polymeric layer that is disposed between the active medium materials of the meta-atoms and the substrate) can be removed as described above in connection with FIG. 6A. As is evident from FIG. 10A, the resulting structure includes meta-atoms 352 having two or more different heights. For example, some of the meta-atoms (e.g., 352C) have a first height, whereas some of the meta-atoms (e.g., 352D) have a different second height.

Although the foregoing examples describe meta-surfaces in which the meta-atoms have different heights, at least some of the implementations also can be used for manufacturing meta-atoms of the same height. For example, the processes that result in the doughnut-shaped meta-atoms in FIG. 5 and FIG. 6 can be used to produce optical elements having a metasurface in which all the meta-atoms are of the same height. Likewise, the processes depicted in FIGS. 7, 8A-8B, 9A-9B and 10A-10B can be used to produce optical elements having a metasurface in which all the meta-atoms are of the same height.

The structures shown in FIGS. 5A-5B, 6A-6B and 7, as well as FIGS. 8A-8B, 9A-9B and 10A-10B, may serve as an optical element that can be incorporated into an optical device (e.g., a light emitting or light sensing device). In such devices, the optical element can be positioned to intersect outgoing light (i.e., light produced by a light emitter such as a light emitting diode (LED), an infra-red (IR) LED, an organic LED (OLED), an infra-red (IR) laser or a vertical cavity surface emitting laser (VCSEL)) or to intersect incoming light that is to be detected by a light sensor (e.g., a CCD or CMOS sensor). The metastructure of the optical element can change, e.g., a local amplitude, local phase, or both, of the outgoing or incoming light wave.

In the illustrated examples of FIGS. 4, 5A, 6A, 7, 8A, 9A and 10A, a thin residual polymeric layer is disposed between the active medium material(s) of the meta-atoms 52, 152, 252, 352 and the substrate 24. However, as noted above, in other implementations, the active medium material(s) of the meta-atoms can be disposed directly on the substrate 24 without any intervening polymeric layer.

The meta-atoms may be arranged, in some cases, so that the matastructure 52, 152, 252, 352 functions, for example, as a lens, grating coupler or other optical element. In other instances, the meta-atoms can be arranged such that the metastructure can function, for example, as a fanout grating, diffuser or other optical element. In some implementations, the metasurfaces may perform other functions, including polarization control, negative refractive index transmission, beam deflection, vortex generation, polarization conversion, optical filtering, and plasmonic optical functions. The metastructure can be used, for example, to modify one or more characteristics (e.g., phase, amplitude, angle, etc.) of an emitted or incoming light wave as it passes through the metastructure. The optical element may be, or include, for example, a lens, lens array, beam splitter, diffuser, polarizer, bandpass filter, or other optical element. Examples of diffractive optical elements that can be manufactured using the foregoing techniques include diffraction and other gratings, beam splitters, beam shapers, collimators, diffractive diffusers, as well as other optical elements.

Various modifications can be made within the scope and spirit of the foregoing disclosure. Further, features described above in connection with different examples may, in some cases, be included in the same implementation. Accordingly, other implementations are within the scope of the claims.

What is claimed is:

1. An apparatus comprising:
- a substrate;
- an optical element comprising:
  - an optical metasurface on the substrate, the optical metasurface including meta-atoms,
  - wherein at least some of the meta-atoms have a first height and others of the meta-atoms have a second height that differs from the first height, and
  - wherein a metamaterial of each of the meta-atoms has an annular shape in a top view; and
- a polymeric layer between the substrate and the metamaterial of each of the meta-atoms, wherein sidewalls of the polymeric layer are aligned with sidewalls of the metamaterial, and wherein the polymeric layer exposes portions of the substrate spaced apart from the meta-atoms.

2. The apparatus of claim 1 wherein some of the meta-atoms have a third height that differs from the first height and from the second height.

3. The apparatus of claim 1 wherein the metamaterial laterally surrounds a hollow interior of each of the meta-atoms.

4. The apparatus of claim 1 wherein the metamaterial of each of the meta-atoms comprises a first metamaterial surrounded laterally by a second different metamaterial, wherein each of the first metamaterial and the second different metamaterial has an annular cross-section.

5. The apparatus of claim 1 wherein the metamaterial has a high index of refraction and a low optical loss.

6. A method of manufacturing an optical element comprising:
- imprinting a polymeric layer that is disposed on a substrate, wherein the imprinting results in formation of projections, extending away from the substrate, of material of the polymeric layer;
- forming meta-atoms comprising a first metamaterial layer, wherein forming the meta-atoms includes depositing the first metamaterial layer over the projections;
- removing a portion of the first metamaterial layer to expose a surface of the projections of the material of the polymeric layer; and
- removing a residual portion of the polymeric layer, to form a second polymeric layer between the substrate and the first metamaterial layer of each of the meta-atoms, wherein sidewalls of the second polymeric layer are aligned with sidewalls of the first metamaterial layer, and wherein the second polymeric layer exposes portions of the substrate spaced apart from the meta-atoms.

7. The method of claim 6 wherein some of the meta-atoms have a first meta-atom height and other ones of the meta-atoms have a second meta-atom height that differs from the first meta-atom height.

8. The method of claim 6, wherein each of the meta-atoms has an annular cross-section.

9. The method of claim 6 including:

depositing a second metamaterial layer in areas where the residual portion of the polymeric layer was removed, such that each of the meta-atoms has a solid cross-section.

10. The method of claim 9 wherein the second metamaterial layer is composed of a same material as a material of the first metamaterial layer.

11. The method of claim 9 wherein the second metamaterial layer is composed of a material that is different from a material of the first metamaterial layer.

12. The method of claim 11 wherein the solid cross-section of each of the meta-atoms includes an annular portion composed of the first metamaterial layer surrounded laterally by a core portion composed of the second metamaterial layer.

13. The method of claim 6 wherein forming the meta-atoms further includes depositing a second metamaterial layer over the projections, wherein the second metamaterial layer is composed of a different material from the first metamaterial layer, and wherein each of the meta-atoms includes a first annular ring composed of the first metamaterial layer and a second annular ring composed of the second metamaterial layer.

14. The method of claim 6, comprising:

after removing the residual portion of the polymeric layer, depositing an active medium material inside an annular shape of the first metamaterial layer of each of the meta-atoms.

15. The method of claim 14, wherein the active medium material is different from a material of the first metamaterial layer.

16. The method of claim 14, comprising:

after depositing the active medium material, removing a portion of the active medium material that is outside the annular shape of the first metamaterial layer of each of the meta-atoms, to expose a surface of the substrate.

17. The method of claim 6, wherein removing the residual portion of the polymeric layer comprises completely removing the polymeric layer from inside an annular shape of the first metamaterial layer of each of the meta-atoms.

* * * * *